US007114276B2

(12) United States Patent
Scherba

(10) Patent No.: US 7,114,276 B2
(45) Date of Patent: Oct. 3, 2006

(54) INFLATABLE PROJECTION SCREEN

(75) Inventor: Robert J. Scherba, Richfield, OH (US)

(73) Assignee: Scherba Industries, Inc., Brunswick, OH (US)

( * ) Notice: Subject to any disclaimer, the term of this patent is extended or adjusted under 35 U.S.C. 154(b) by 215 days.

(21) Appl. No.: 10/759,632

(22) Filed: Jan. 16, 2004

(65) Prior Publication Data

US 2004/0211100 A1 Oct. 28, 2004

Related U.S. Application Data

(60) Provisional application No. 60/441,013, filed on Jan. 17, 2003.

(51) Int. Cl.
*G02F 15/00* (2006.01)

(52) U.S. Cl. .......................... 40/610; 40/446; 359/460; 353/71; 353/119

(58) Field of Classification Search .................. 40/610, 40/446, 212; 359/460; 353/71, 119
See application file for complete search history.

(56) References Cited

U.S. PATENT DOCUMENTS

| | | | | | |
|---|---|---|---|---|---|
| 460,674 | A | * | 10/1891 | Gross | 40/214 |
| 2,685,817 | A | * | 8/1954 | Freeman | 359/449 |
| 3,586,432 | A | * | 6/1971 | Pentes, Jr. | 353/74 |
| 3,763,917 | A | * | 10/1973 | Antinone | 160/354 |
| 3,877,719 | A | | 4/1975 | Lewis et al. | |
| 3,965,546 | A | | 6/1976 | Hickle | |
| 4,240,721 | A | * | 12/1980 | Drop, Sr. | 353/74 |
| 4,369,591 | A | * | 1/1983 | Vicino | 40/610 |
| 4,437,790 | A | | 3/1984 | Trop | |
| 4,597,633 | A | * | 7/1986 | Fussell | 359/451 |
| 5,007,212 | A | * | 4/1991 | Fritts et al. | 52/2.18 |
| RE33,709 | E | * | 10/1991 | Vicino | 406/10 |
| 5,125,177 | A | * | 6/1992 | Colting | 40/610 |
| 5,152,092 | A | * | 10/1992 | O'Brien | 40/610 |
| 5,313,999 | A | * | 5/1994 | Colson et al. | 160/121.1 |
| 5,402,591 | A | * | 4/1995 | Lee | 40/610 |
| D365,400 | S | | 12/1995 | Scherba | |
| 5,493,816 | A | | 2/1996 | Willemsen | |
| 5,555,679 | A | * | 9/1996 | Scherba | 52/2.18 |
| 5,570,544 | A | * | 11/1996 | Hale et al. | 52/2.18 |
| 5,586,594 | A | * | 12/1996 | Shapoff | 160/135 |
| 5,921,832 | A | | 7/1999 | Thiermann | |
| D413,169 | S | | 8/1999 | Scherba | |
| 5,937,586 | A | | 8/1999 | Scherba | |
| 6,008,938 | A | * | 12/1999 | Suehle et al. | 359/443 |
| 6,009,895 | A | | 1/2000 | Wass | |
| 6,029,404 | A | * | 2/2000 | Lewis | 52/2.18 |
| 6,070,351 | A | * | 6/2000 | Verret | 40/603 |
| 6,164,314 | A | | 12/2000 | Saputo et al. | |
| 6,233,767 | B1 | | 5/2001 | Horowitz | |
| 6,240,666 | B1 | * | 6/2001 | Apel et al. | 40/610 |
| 6,257,550 | B1 | | 7/2001 | Saputo et al. | |
| 6,367,934 | B1 | * | 4/2002 | Salesky et al. | 353/74 |
| 6,581,334 | B1 | | 6/2003 | Oney et al. | |
| 6,643,875 | B1 | | 11/2003 | Boso et al. | |
| 6,668,475 | B1 | * | 12/2003 | Carolan | 40/610 |
| 6,874,263 | B1 | * | 4/2005 | Ohmuku | 40/590 |

* cited by examiner

*Primary Examiner*—Gary C. Hoge
(74) *Attorney, Agent, or Firm*—Fay Sharpe Fagan Minnich & McKee; Brian E. Turung

(57) ABSTRACT

An inflatable device that includes at least one display panel for displaying an image by a multimedia device positioned in and/or connected to the inflatable device.

17 Claims, 8 Drawing Sheets

INFLATABLE PROJECTION SCREEN

The present invention claims priority on U.S. Provisional Patent Application Ser. No. 60/441,013 filed Jan. 17, 2003, which is incorporated herein by reference.

The present invention is directed to inflatable devices and more particularly to an inflatable device that displays changeable media.

INCORPORATION BY REFERENCE

U.S. Pat. Nos. 5,555,679; 5,937,586; 6,527,418; D413,169 and D365,400, and U.S. patent application Ser. Nos. 10/217,677 filed Aug. 12, 2002 entitled "Inflatable Component Connector" and No. 60/441,013 filed Jan. 17, 2003 entitled "Inflatable Projection Screen" are incorporated herein by reference to illustrate inflatable devices and the matter in which such devices can be made, inflated and connected together, and which structures can be used in the present invention.

BACKGROUND OF THE INVENTION

Outdoor sponsored events and activities have gained in popularity over the last several years. During sponsored events and activities such as carnivals, fairs, sporting events, trade shows or the like, various areas are partitioned off to define the area for a particular activity or event. Sporting events sponsored by local and/or national advertisers are common year-round. These sponsored activities include basketball, volleyball, tennis, hockey, bike racing, skating courses, obstacle courses, etc. Many of these sponsored activities are one- or two-day events and are commonly situated in a park, a parking lot, a city street, stadium, etc. At such events, the event organizer is typically required to assemble temporary facilities for the particular sponsored event or events. Typically, metal or wooden fences are temporarily assembled to partition off various areas for the events. Structures for concession stands, amusement activities, information booths, retail stands, etc. also have to be temporarily assembly for the event. Collapsible billboards, movie screens, television stands and fences are also temporarily assembled to support advertising and promotional displays during such events. Such structures are typically wooden and/or metal structures. It is not uncommon for an event organizer to spend several days preparing a site for a single day event. Events which require a large structure to be assembled require even more time and expense to set up. The assembly and disassembly of such structures requires a substantial amount of time. Although these outdoor sponsored events have become very popular with the public, the complexity and cost of setting up and sponsoring such events has caused many sponsors to limit the number of sponsored events and/or seek other, less expensive and complex activities to sponsor and/or reduce the complexity or such events.

Organized sports venues such as, but not limited to, college sports, professional sports, the Olympics, etc. also have promotional displays for the fans prior to, during and after the event. For instance, many venues have pre-game festivities. These pre-game festivities may merely include a few displays and/or booths, or can be a complex as a carnival or an Olympic village. During a sporting event, various displays and booths may be setup to promote the sponsors, promote the sporting event, sell merchandise, etc. Many sporting events have half-time shows which typically include one or more bands. These events may also include stages and other structures to enhance visual effect at such shows. Post game festivities may merely include a few displays and/or booths, or be a more complex event. The setup of the displays, booths and other structures at such events takes time and can be costly to store and/or transport such structures. During half-time events for large sport events (e.g., Super Bowl, college foot bowl games, World Cup soccer games, etc.) and/or sport ceremonies (e.g., Olympic opening and closing ceremonies, international sport events, etc.), highly sophisticated shows can occur that involve many structures, display boards, etc. Due to the time constraints for such half-time events and/or shows, many of the structures have to be pre-made and stored in a location close to the half-time events and/or shows. Many facilities cannot store large numbers of structures, thus the size and sophistication of such half-time events and shows is limited.

Inflatable structures, such as those disclosed in U.S. Pat. Nos. 5,937,586; 5,555,679; D413,169 and D365,400, have been successfully used at various sporting events. These inflatable structures are formed into booths to sell food and merchandise; booths to house skill games; gaming structures such as obstacle courses, hockey rinks, volleyball courts, basketball courts, etc.; partition structures; and/or advertising displays. Due to the ability of these inflatable structures to take on both simple and complex shapes, the ease to which such structures can be transported, the swiftness in which such structures can be erected and taken down, the durability of such structures, and the relative low cost of transporting and maintaining such structures, inflatable structures have gained increasing popularity at such events.

Sponsors of such events have continuously strived to attract the attention of consumers at such events. As such, the sponsors have requested larger and/or more complex designs and structures so as to stand out at such events. Multimedia has also been used to attract the attention of consumers. Although inflatable structures have been able to meet much of the demand for size and complexity, the merger of multimedia and inflatable structures has yet to emerge.

In view of the high cost and complexity of setting up temporary facilities for outdoor sponsored events and to attract consumers to such events, there is continues to be a need for a device which can be quickly and cost effectively assembled, a device which is versatile enough to be used in a variety of outdoor events, and a device which can attract the attention of consumers at such events.

SUMMARY OF THE INVENTION

The present invention relates to an inflatable device adapted and designed to supply information and/or advertising to consumers at various events and will be particularly described with reference thereto. However, the present invention has broader applications in that the inflatable device can be used to provide information and/or advertising in many other types of settings. The inflatable device of the present invention can be used at indoor and/or outdoor events. Indeed, the portability of the inflatable device lends itself for use in a number of different venues. The venues that the inflatable device of the present invention can be used include entertainment venues, educational venues, business venues, etc. Examples of some specific venues include, but are not limited to, carnivals, fairs, circuses, sporting events, parks, wrestling events, ice skating events, monster car events, playgrounds, trade shows, trade fairs, cruises, concert events, theater events, cinema events, etc.

Historically, inflatable devices were limited to inflatable structures having a basic balloon and simple product shapes and designs. Such devices were typically limited for advertising purposes (e.g. shapes of products, structures that held advertising banners, structures that included painted advertising, etc.) or simple amusement rides such as the inflatable moon walk. In U.S. Pat. Nos. 5,555,679 and DES 365,400, an inflatable device was developed which functioned as a bar having a canopy suspended above it. The inflatable bar was versatile enough to be used as a carnival stand (e.g., refreshment stand, game stand, retail stand, informational stand, etc.) or the like. The inflatable bar structure expanded the used of inflatables to booths, which in the past were traditionally reserved for wooden or steel structures. In U.S. Pat. Nos. 5,937,586 and DES 413,169, an inflatable structure formed by a plurality of modular units was disclosed. This modular inflatable configuration for an inflatable structure further expanded the use of such inflatables. The modular configuration allowed for more complex inflatable structures to be formed. In U.S. patent application Ser. No. 10/217,677 filed Aug. 12, 2002 entitled "Inflatable Component Connector", a novel connector was disclosed which increases the ease for changing out (e.g., connecting, disconnecting, etc.) various modular components of inflatable device. In U.S. Pat. No. 6,527,418 entitled "Light Cooler", a novel lighting system for an inflatable structure was disclosed. The lighting system is used to safely illuminate the interior of an inflatable so as to make the inflatable more pronounced in low light or nighttime events. The present invention expands on the inflatable devices and accessories for such devices disclosed above to develop an inflatable device that incorporates one or more multimedia devices on and/or in the inflatable device. These multimedia devices include, but are not limited to, audio equipment (e.g., receivers, CD players, DVD players, mini-DVD players, tape player/recorders, MP3 players, turntables, speakers, amplifiers, equalizers and processors, digital audio recorders, mixers, effectors, microphones, etc.), video equipment (e.g., VCR, DVD player, TV receiver, TV tuner, cable box, satellite box, cathode ray tube screen, plasma screen, LCD screen, camcorder, camera, digital video recorder, projector, etc.), satellite equipment (e.g., satellite dish, satellite receiver and/or satellite box, etc.), computer equipment (e.g., desktop computer, laptop computer, tablet computer, PDA, printer, scanner, monitor, modem, game system, game controller, keyboard, storage devices, mouse, software, internet connections, satellite connections, etc.), communications equipment (e.g., antennas, telephones, cellular phones, cable connections, DSL connections, telephone connections, satellite connections, T1 connections, T2 connections, modems, fiber optic cables, inferred connections, etc.), power equipment, and/or lighting equipment and lights (e.g., incandescent lighting, florescent lighting, disco lighting, laser lighting, ultraviolet lighting, etc.). The multimedia devices are designed in part to enhance the visual effects of the inflatable device, provide viewers with a stream of information and/or make the inflatable device interactive with viewers. In the age of advertising wherein the consumer is constantly bombarded with advertising literature and sales gimmicks, it has become increasing difficult to attract and maintain the attention of individuals at any particular activity or event for any length of time. The use of multimedia in combination with a large inflatable device is in part designed to attract such attention and to increase the time a person views the information being conveyed by the inflatable device.

In accordance with one aspect of the invention, the inflatable device includes video equipment that is designed to display non-fixed images on at least a portion of the inflatable device. The inflatable device creates an environment to enable multimedia devices to be displayed on a screen material. The material used to at least partially form the inflatable device at least partially blocks light from the interior portion of the inflatable device when the inflatable device is in an inflated or partially inflated state. The material thus creates a darkened environment within one or more sections of the inflatable device which enables the one or more multimedia components (e.g. lights, projectors, etc.) to display images and/or visual effects on one or more outer surfaces of the inflatable device. As can be appreciated, the inflatable device can be made of materials that have differing light blocking effectiveness so as to achieve the desired darkness in the inflatable device. As a result, the inflatable device can be used during the day or night to display one or more images and/or visual effects on the one or more outer portions of the inflatable device. For instance, a relative low lumen projector (e.g. 2100–15000 lumen) can be used during a sunny day to display a relatively large (e.g. 6'×6' image, 12'×12' image, etc.) and vivid pictures on one or more outer surfaces of the inflatable device. The same projector would generate a barely visible picture if such image was projected on an outside screen during the same sunny day. Typically the inflatable device has multiple sides or regions which can be used to display one or more non-fixed images. For instance, a cubical inflatable device has four side walls which can be used to display a non-fixed image, whereas a wedge-shaped inflatable device has three side walls which can be used to display a non-fixed image. The displayed non-fixed image can be generated on one or more of the sides of the inflatable device. If not all the side walls are used to display a non-fixed image, such sides can be used to display fixed images (e.g., posters, painted pictures and/or print, printed material, electronically scrolled printed material, etc.) or be left blank. The displayed non-fixed image can take many forms. In one example, the displayed non-fixed image constitutes one or more pictures (e.g., slides, transparencies, etc.). In another and/or alternative example, the displayed non-fixed image is a pre-recorded digital and/or analog images (e.g., VCR tape, DVD, CD, 8 mm tape, other digitally recorded format, etc.). In still another and/or alternative example, the displayed non-fixed image is a live image (e.g., live TV broadcast, live satellite broadcast, live cable broadcast, live feed from a camera, computer generated image, etc.). In yet another and/or alternative example, the displayed non-fixed image is a light presentation (e.g., laser lights, disco lights, etc.). The light presentation can be a set pattern or integrated with or respond to musical sounds. As can be appreciated, a non-fixed image and a fixed image can be displayed on the same side of the inflatable device. The use of displayed non-fixed images on the inflatable device can significantly expand the uses of the inflatable. In the past, many inflatable structures were used for a specific event. The use of changeable displays on the inflatable device allows the inflatable device to display one or more images to fit a certain event. As such, a sponsor of many events could have an inflatable device made that can be used in such various events. In one embodiment of the invention, the inflatable device includes at least one display screen. In one aspect of this embodiment, the display screen includes a material upon which an image can be projected. Typically the material is a backlit material (e.g., white material, green/gray material, etc.); however, other colored materials can be used. The material can be used to display an image such as from a projector or another type of a device. In another and/or alternative aspect of this embodiment, the display screen is or includes a plasma screen and/or LCD screen which are used to directly generate the image. In still another and/or alternative embodiment of the invention, at least two sides or regions of the inflatable include a display screen. In one aspect of this embodiment, the interior portion of the inflatable is at least partially partitioned to reduce or prevent light from a projected image from interfering with one or more other displayed images on one or more other screens. For instance, when two of more projectors are used to display images on two or more display screens, the light generated by one projector can cause the image generated by the other projector to be distorted, and/or obscured on another display screen. The use of partitions that fully or partially block light reduces or eliminates this problem. In one non-limiting design, the partitions are made of a flexible material so as to be conveniently used in the inflatable device; however, this is not required. In another and/or alternative non-limiting design, the partition can be repositioned in the inflatable device and/or rolled up or rolled down so as to obtain the desired partitioning within the inflatable device. In another and/or alternative aspect of this embodiment, the interior portion of the inflatable does not include partitions when projecting images on multiple portions of the inflatable device.

In accordance with another and/or alternative aspect of the invention, the inflatable device includes a seating or cavity structure that is designed to support one or more components of multimedia equipment. When the inflatable device is inflated, one or more multimedia components are inserted in the interior and/or on the exterior of the inflatable device. The inflatable component can include one or more structures that can be inserted and/or connected to the interior of the inflatable device after being inflated and/or be formed as the inflatable device is inflated. These structures can be used to conveniently place and/or secure one or more of the components of the multimedia equipment in and/or about the inflatable device. The structures can be used to facilitate in the easy and/or organized arrangement and/or positioning of one or more of the multimedia components located inside the inflatable device. The structures also can be used to elevate one or more of the multimedia components located inside the inflatable device so as to maintain the cleanness of the equipment and/or to reduce damage to the equipment that may result from a wet ground surface, a rocky ground surface, etc. In one embodiment of the invention, the inflatable device includes at least one ledge or table that is used to support a projector and/or other type of multimedia equipment. The position, orientation, shape and size of the ledge or table is typically selected to enable a projector and/or other type of multimedia equipment to be conveniently placed on and supported by the ledge or table and to direct the image projected by the projector and/or other type of multimedia equipment onto a desired display screen. In another and/or alternative embodiment of the invention, the ledge or table is designed to at least partially support one or more lights in and/or on the inflatable device. In still another and/or alternative embodiment of the invention, the ledge or table is designed to at least partially support one or more audio components in and/or on the inflatable device. In yet another and/or alternative embodiment of the invention, the ledge or table is at least partially inflatable. In still yet another and/or alternative embodiment of the invention, the region about the ledge or table is reinforced and/or otherwise protected to reduce the chance of damage to equipment on the ledge or table. In a further and/or alternative embodiment of the invention, the ledge or table includes one or more securing devices to at least partially secure one or more components on the ledge or table to reduce the chance of damage to equipment on the ledge, and/or to secure the ledge or table in position relative to the inflatable device.

In accordance with still another and/or alternative aspect of the invention, the inflatable device includes one or more openings or windows. In one embodiment of the invention, the one or more openings or windows are used to receive lights and/or multimedia equipment. In another and/or alternative embodiment of the invention, an advertising banner is placed at least partially within and/or over the front of the opening or window such that the banner is viewable from the exterior of the inflatable device. In one aspect of this embodiment, one or more lights are placed in and/or hung in the window to at least partially illuminate the banner. In one non-limiting design, at least one light is the same or similar to the light disclosed in U.S. Pat. No. 6,527,418 entitled "Light Cooler", which is incorporated herein by reference. The light in the opening or window can be suspended in the window, rest on a ledge of the opening or window, etc. Typically the light is suspended in the window by one or more cords and/or an electrical wire; however, many other arrangements can be used. In still another and/or alternative embodiment, the banners are detachably connected to the window. The detachability of the banner allows for various types of banners to be conveniently exchanged for other banners. The banners can be detachably connected in a variety of way such as, but not limited to, zippers, Velcro, snaps, loops and cord, etc. In one aspect of this embodiment, the opening or window includes a zipper that is used to attach and detach a banner or other advertising media to the opening or window. The zipper typically is positioned on the outer edge or between the inner and outer edge of the opening or window; however, the zipper can be positioned in other locations. In one non-limiting example, one or more lights are positioned between the inner and outer edges of the opening or window. A blackout curtain is secured at or near the inner edge of the opening or window to inhibit or prevent light from the light to be cast into the interior of the inflatable device. As can be appreciated, the blackout curtain can be secured at or near the inner edge in a variety of ways (e.g., sewn, zipper, snaps, Velcro, etc.). The one or more lights are suspended in the window by one or more cords and/or an electrical wire between the inner and outer edges of the opening or window. A banner is detachably connected to the window at or near the outer edge of the window by a zipper. In this particular arrangement, the blackout curtain inhibits or prevents light from casting light into the interior of the inflatable device which light illuminates the interior surface of the banner to cause the banner to light up and visually stand out.

In accordance with yet another and/or alternative aspect of the invention, the inflatable device includes an opening with a ledge. The opening with a ledge can be used as a counter to display merchandise, advertising and/or promotional literature, and/or function as a food dispensing counter.

In accordance with still yet another and/or alternative aspect of the invention, the inflatable device includes one or more displays on the top of the inflatable device. The displays can be inflatable components or be made non-inflatable (e.g., plastic, wood, metal, foam, cardboard, Styrofoam, etc.). The one or more displays can have a variety of shapes and sizes. The one or more displays can have a many of types of advertising, drawings, etc. The displays can be used to convey information by advertising, used to cover or camouflage one or more multimedia devices (e.g. speakers, cameras, microphones, antennas, satellite dishes, etc.). The displays can be detachably connected to the inflatable device so that one or more of the displays can be changed out for other displays as so desired. In one embodiment of the invention, one or more displays include attachment poles to provide support and/or a connector for the one or more displays at the top of the inflatable device. One or more of the attachment poles can also function as a fluid conduit when the display is inflatable. The one or more displays can be connected to the top of the inflatable device in a number of ways (e.g., zipper, cord, stitching, Velcro, snaps, etc.).

In accordance with another and/or alternative aspect of the invention, the inflatable device includes one or more support poles to facilitate in maintaining the desired shape of the inflatable. When large inflatable devices are used, the inflatable device can have a tendency to sway or move, especially when exposed to wind in an outdoor environment. The one or more support poles are designed to reduce the movement of the inflatable device. When the inflatable device includes projected images, the movement of the inflatable device may cause the displayed image to be temporarily distorted. The use of one or more poles reduces this problem. In addition, the movement of the inflatable device may cause one or more multimedia components to be repositioned and/or damaged. The use of one or more poles also reduces this problem. In one embodiment of the invention, the inflatable device includes one or more pockets that are designed to receive an end of a pole. In one non-limiting design, at least one pocket is located at or near a corner of the inflatable device. In another and/or alternative embodiment of the invention, the inflatable device includes one or more guide tabs that are designed to maintain the pole in a desired position. The guide tabs typically engage the pole between the ends of the pole. In one non-limiting design, at least one guide tab includes a grommet through which the pole is inserted. In still yet another and/or alternative embodiment of the present invention, the design and/or arrangement of the pole support is similar or the same as the manner disclosed in U.S. Pat. No. 5,937,586, which is incorporated herein by reference.

In accordance with still yet another and/or alternative aspect of the invention, the inflatable device is a modular structure that can be attached to and detached from various inflatable components. In one embodiment of the invention, there is provided an inflatable component that is at least partially releasably connected to another inflatable component and/or blower by one or more connectors. The inflatable component can take on a number of different shapes and sizes and is typically formed from one or more panels. In one aspect of this embodiment, the sides of the one or more panels are connected together to limit the amount of fluid leakage from the connected panel edges. The one or more panels can be connected in a number of ways such as, but not limited to, a melted seam, glued edges, stitched edges, laced edges, zipped edges, Velcro connected edges, snapped and/or buttoned edges, tongue and groove connected edges, hooked edges, etc. and/or by any combination of these arrangements. In another and/or alternative aspect of this embodiment, the one or more panels include a flexible and durable material such as, but not limited to, coated nylon materials, coated Kevlar materials, and/or the like. Such materials are ideally flexible, durable, fluid repellant, and/or substantially fluid impermeable so as to be inflated and deflated without damage or with minimal damage, and/or are durable enough to resist wear and/or exposure to the elements over an extended period of time. As can be appreciated, a wide variety of additional or other materials which are flexible, durable, fluid repellant, and/or substantially non-permeable to various fluids (e.g. liquid, gas, etc.) can used by the present invention. In still another and/or alternative aspect of this embodiment, the inflatable component includes at least one fluid opening to enable a fluid to flow into and/or out of the inflatable component.

In accordance with a further and/or alternative embodiment of the invention, two or more modular components of the inflatable device include a connector that at least partially allows fluid to pass between the modular component and allows the modular components to be at least partially releasably connected. In one aspect of this embodiment, the connector includes a base having an opening that at least partially allows fluid to pass through the opening. In another and/or alternative aspect of this embodiment of the invention, the base of the connector is connected to a blower or secondary inflatable component to which the inflatable component is to be connected. When an inflatable component is to be connected to a blower, the base of the connector is typically formed on and/or connected to the end of the blower. In still another and/or alternative aspect of this embodiment, when one inflatable component is connected to another inflatable component, the base of the connector is formed on and/or connected to one of the inflatable components. In yet another and/or alternative aspect of this embodiment, the base of the connector can have a variety of shapes and/or sizes, and/or have a variety of opening sizes in the base. In still yet another and/or alternative aspect of this embodiment, the base of the connector is at least partially formed from a durable material to resist wear. Such materials include, but are not limited to, hard plastic, rubber, fiberglass, metal and/or the like. In still yet a further and/or alternative aspect of this embodiment, the base includes a connection flange adapted to be connected to an inflatable component, secondary inflatable component, and/or blower. The connection flange typically fully extends around the perimeter of the base. In still another and/or alternative aspect of this embodiment, the base includes an extension wall that rises upwardly from the connection flange. In yet another and/or alternative aspect of this embodiment, the connection flange contacts the interior surface of the panel of an inflatable component when the connection flange is connected. In still yet another and/or alternative aspect of this embodiment, a fluid obstructor to inhibit fluid flow is positioned on and/or about the fluid opening in the base. The fluid obstructor is designed to interfere with the flow of fluid through the opening. Such a fluid obstructor can include, but is not limited to, a valve, a mesh material, filter material, semi-permeable material, and/or the like. The fluid obstructor can be used as a dampener, to assist in ensuring an inflatable module remains inflated, etc. In accordance with still another and/or alternative embodiment of the present invention, the connector includes a cap that is designed to at least partially releasably connect to the base of the connector. In one aspect of this embodiment, the cap is designed to at least partially secure one inflatable component to another inflatable component, and/or blower. In another and/or alternative aspect of this embodiment, the cap includes one or more openings to at least partially allow fluid to at least partially pass through the connector when the cap is at least partially releasably connected to the base. In yet another and/or alternative aspect of this embodiment, the cap includes a connection arrangement to at least partially releasably connect the cap to the base. The connection arrangement can take a number of different arrangements.

The connection arrangement includes at least one thread on the cap so that the cap can be at least partially threaded on the base of the improved connector. As can be appreciated, other and/or additional arrangements can be used to releasably connect the cap to the base of the improved connector. Such arrangements include, but are not limited to, snaps, buttons, zippers, twist lock, connection rings, Velcro, clamps, roping, locks, etc. In still another and/or alternative aspect of this embodiment, the connection arrangement includes a securing flange on the cap and/or base which securing flange is used to releasably connect the base and the cap. The cap can include a securing flange and/or the base can include a securing flange. In still and/or alternative aspect of this embodiment, the securing flange includes a connector to releasably secure to the cap or base or securing flange of the cap or base. The connector can include a number of different arrangements such as, but not limited to, snaps, buttons, zippers, twist lock, connection rings, Velcro, clamps, roping, locks, etc. In yet another and/or alternative aspect of this embodiment, the cap includes a sealing flange that extends at least partially about the perimeter of the cap. The sealing flange is adapted to at least partially entrap and/or secure a portion of the panel of the inflatable component between the sealing flange and a portion of the base of the connector. As such, the sealing flange at least partially secures a portion of the inflatable component when the cap is releasably connected to the base. The base of the improved connector can include a sealing landing that extends at least partially about the perimeter of the base. The sealing landing is adapted to at least partially entrap and/or secure a portion of the panel of the inflatable component between the sealing flange and the sealing landing when the cap is releasably connected to the base. The connection flange of the base can also function as the sealing landing. The sealing landing can be spaced from the connection flange of the base. In this design, the sealing landing can be positioned adjacent to, about, or below the connection flange. In still yet another and/or alternative aspect of this embodiment, the cap includes a one or more gripping elements to facilitate in the insertion and/or removal of the cap from the base of the improved connector. In accordance with still yet another and/or alternative embodiment of the invention, at least one inflatable component includes a connection disk. The connection disk can have a variety of shapes and/or sizes. The connection disk includes an opening that is at least partially aligned with and/or is in fluid communication with the fluid opening in the inflatable component. In one aspect of this embodiment, the connection disk is at least partially designed to reinforce the region of the inflatable component and/or inhibit damage to the region of the inflatable component that is entrapped and/or secured between the base and the cap when the cap is releasably connected onto the base of the connector. In another and/or alternative aspect of this embodiment, the connection disk is at least partially designed to inhibit or prevent the region of the inflatable component that is entrapped and/or secured between the base and the cap when the cap is releasably connected to the base of the connector from disengaging from the cap and/or base. In still another and/or alternative aspect of this embodiment, the connection disk is at least partially made of a more rigid and/or resilient material than the material of the inflatable component. In yet another and/or alternative aspect of this embodiment, the connection disk is partially made of the same or similar material as that of the inflatable component. In still yet another and/or alternative aspect of this embodiment, the connection disk is secured to inflatable component. The connection disk can be secured to the inflatable component in any number of ways such as, but not limited to, a melted seam, adhesive, stitching, lacing, zipper, Velcro, snaps and/or buttons, tongue and groove connection, hooks, connection rings, clamps, etc., and/or by any combination of these arrangements. In a further and/or alternative aspect of this embodiment, the connection disk is at least partially entrapped and/or secured between the base and the cap when the cap is releasably connected to the base of the connector. In accordance with still a further and/or alternative embodiment of the invention, two or more inflatable components include a joining arrangement to at least partially releasably secure the inflatable components. The joining arrangement at least partially secures the inflatable components at a position at least partially spaced from the connector. In one aspect of this embodiment, the joining arrangement is spaced from the connector. In another and/or alternative aspect of this embodiment, the joining arrangement includes one or more arrangements such as, but not limited to, lacing, zipper, rope, straps, Velcro, snaps and/or buttons, tongue and groove connection, connection rings, hooks, etc. and/or by any combination of these arrangements. The joining arrangement includes ropes, straps, lacing or the like at least partially connected to the inflatable component. The rope, straps, lacing or the like are adapted to be connected to connectors on the secondary inflatable component. Such connectors can include, but are not limited to, hooks, grommets, loops, clamps, and/or the like. In one non-limiting design, the hooks, grommets, loops, clamps, and/or the like are connected to a flange, which in turn is connected to one inflatable component. The flange is typically flexible, but this is not required. The flange can be made of the same or different material as one of the inflatable components. The flange typically is nonreleasably secured to one of the inflatable components. The flange facilitates in the orienting of the hooks, grommets, loops, clamps, and/or the like relative to an inflatable component during the connection and disconnection process. In another and/or alternative aspect of this embodiment, the joining arrangement includes ropes, straps, lacing or the like at least partially connected to the secondary inflatable component. The rope, straps, lacing or the like are adapted to be connected to connectors on an inflatable component. Such connectors can include, but are not limited to, hooks, grommets, loops, clamps, and/or the like. In one non-limiting design, the hooks, grommets, loops, clamps, and/or the like are connected to a flange, which in turn is connected to the inflatable component. The flange is typically flexible, but this is not required. The flange can be made of the same or different material as one of the inflatable components. The flange typically is nonreleasably secured to the inflatable component; however, it can be releasably secured to the inflatable component. The flange facilitates in the orienting of the hooks, grommets, loops, clamps, and/or the like relative to the one of the inflatable components during the connection and disconnection process. In still another and/or alternative aspect of this embodiment, the joining arrangement is the primary arrangement to at least partially releasably secure two or more inflatable components. The connector also facilitates in securing together the inflatable components. When the joining arrangement is used, the joining arrangement typically functions as the principal arrangement to at least partially releasably secure the inflatable components. In accordance with still a further and/or alternative embodiment of the present invention, one or more inflatable components include at least one access opening to enable an individual to insert the cap onto and/or remove the cap from the base of the connector during the connecting and/or disconnecting of the inflatable components and/or from a blower. In one aspect this embodiment, the access opening is located in at least one panel of the inflatable component and adjacent to the fluid opening of an inflatable component. During the connection of one inflatable component with another inflatable component and/or blower, the fluid opening in the inflatable component is inserted at least partially about the extension wall of the base of the connector. The individual connecting the inflatable component to another component can place his/her hand through the access opening and guide the fluid opening in the inflatable component at least partially about the extension wall of the base of the connector. Once the fluid opening is inserted about the extension wall of the base, the individual can then place his/her hand through the access opening and releasably secure the cap onto the base of the connector. In another and/or alternative aspect of this embodiment, the access opening is at least partially closable to at least partially inhibit fluid from passing through the access opening. The access opening is at least partially closed by, but not limited to, a zipper, Velcro, buttons, snaps, hooks and/or the like. In still another and/or alternative aspect of this embodiment, an inflatable component is connected to another inflatable component via the securing arrangement before or after the access opening is used to releasably secure the cap to the base. When the inflatable component needs to be replaced and/or removed from another inflatable component, the above described sequence of steps is reversed. In accordance with still yet a further and/or alternative embodiment of the present invention, the connection arrangement includes a securing mechanism to inhibit or prevent the base and cap from inadvertently releasably disconnecting from one another. Such securing arrangement can include a variety of arrangements such as, but not limited to, bolts, screws, pins, clips, snaps, connection rings, hooks, latches, roping, etc. and the like.

In accordance with still yet a further and/or alternative aspect of the present invention, the inflatable device can be used by itself or in combination with one or more other inflatable devices. In one embodiment of the invention, the sides of one inflatable device and one or more other inflatable devices are aligned so that a fluid opening between the inflatable devices are at least partially aligned, thereby providing a passageway for the fluid between the interiors of the inflatable devices. In another and/or alternative embodiment of the invention, the fluid opening in one inflatable component is smaller than the surface area of the panel the fluid opening is inserted therein, so as to create a pressure drop when the fluid passes through the fluid opening. This type of fluid opening design facilitates in maintaining the inflatable component in a substantially fully inflated state. Furthermore, the inflatable component resists deflating when one of the sides of the inflatable component is impacted. This damping action of pressure differentials between two or more inflatable components and helps to stabilize and maintain the integrity of the inflatable device. In still another and/or alternative embodiment, the fluid opening in the inflatable component is positioned substantially in the center of the panel containing the fluid opening to provide a substantially uniform fluid flow and/or fluid pressure into and/or out of the inflatable component; however, the fluid opening can be positioned in other locations on the panel. In yet another and/or alternative embodiment, a semi-permeable boundary can be positioned at least partially about the fluid opening to limit the fluid flow through the semi-permeable boundary. In one aspect of this embodiment, the semi-permeable boundary includes, but is not limited to, a mesh material, semi-fluid permeable material, and/or the like. In one non-limiting arrangement, the mesh material is similar to or the same as disclosed in U.S. Pat. No. 5,937,586, which is incorporated herein by reference.

In accordance with yet another and/or alternative aspect of the present invention, one or more inflatable components of the inflatable device are be formed by multiple panels. In one embodiment, the manner in which the inflatable component is formed is similar to or the same as the manner disclosed in U.S. Pat. No. 5,937,586, which is incorporated herein by reference.

In accordance with still another and/or alternative aspect of the present invention, one or more inflatable components of the inflatable device include an air vacating arrangement which provides for quick deflation of the inflatable component when the inflatable component is being disassembled. The air vacating mechanism can also be designed to allow access to the interior of the inflatable component for purposes of repair, assembly, disassembly, insertion of weights, etc. In one embodiment, the design and/or arrangement of the air vacating arrangement is similar to or the same as the manner disclosed in U.S. Pat. No. 5,937,586, which is incorporated herein by reference.

In accordance with yet another and/or alternative aspect of the invention, the inflatable device includes one or more anchor points to secure the inflatable device in a particular position. In one embodiment of the invention, at least one anchor point includes a ring or loop that is adapted to be connected to a chain, cord, rope and/or the like. In one aspect of this embodiment, a flexible material is connected to the ring or loop at one end and connected to the inflatable device at another end. In another and/or alternative embodiment of the invention, one or more anchor points are positioned at or near the base of the inflatable device. In still another and/or alternative embodiment of the invention, one or more anchor points are positioned above the base of the inflatable device. In yet another and/or alternative embodiment of the invention, one or more anchor points are positioned at or near an edge of the inflatable device.

In accordance with still yet another and/or alternative aspect of the invention, the inflatable device includes a generally flat base and a polygonal cross-sectional shape throughout a majority of the inflatable device. As can be appreciated, the base of the inflatable device is not required to be generally flat, thus can have other shapes such as, but not limited to a curved shape. In one embodiment of the invention, the cross-sectional shape of the inflatable device along much of the height of the inflatable device is triangular thereby forming a generally wedge-shape structure. In this design, the inflatable device has three sides that can be used for advertising panels and/or display screens. In one non-limiting design, one side includes a display screen for displaying multimedia pictures and the other two sides include banners and/or printed material. In another and/or alternative embodiment of the invention, the cross-sectional shape of the inflatable device along much of the height of the inflatable device is square thereby forming a generally cubic or box-like structure. In this design, the inflatable device has four sides that can be used for advertising panels and/or display screens. In one non-limiting design, one side includes a display screen for displaying multimedia pictures and the other three sides include banners and/or printed material. In another and/or alternative non-limiting design, two sides include a display screen for displaying multimedia pictures and the other two sides include banners and/or printed material.

In accordance with yet another and/or alternative aspect of the invention, the inflatable device includes a generally flat base and cross-sectional shape that is not polygonal throughout a majority of the inflatable device. As can be appreciated, the base of the inflatable device is not required to be generally flat, thus can have other shapes such as, but not limited to a curved shape. In one embodiment of the present invention, the cross-sectional shape of the inflatable device along much of the height of the inflatable device is circular thereby forming a generally cylindrical structure. In this design, the inflatable device has no one side, but portions of the surface of the inflatable device can be used for advertising panels and/or display screens. In another and/or alternative embodiment of the present invention, the cross-sectional shape of the inflatable device along much of the height of the inflatable device is oval. In this design, the inflatable device has no one side, but portions of the surface of the inflatable device can be used for advertising panels and/or display screens. In still another and/or alternative embodiment of the present invention, the cross-sectional shape of the inflatable device along much of the height of the inflatable device includes one or more arcuate sides and one or more straight sides. In this design, one or more sides of the inflatable device can be used for advertising panels and/or display screens. In yet another and/or alternative embodiment of the present invention, the cross-sectional shape of the inflatable device along much of the height of the inflatable device is selected to form a certain shape (e.g., a person's head, a cave, a house, a vehicle, a space ship, an asteroid, etc.). In this design, one or more sides of the inflatable device can be used for advertising panels and/or display screens. For example, if the inflatable device is formed to be the shape of a person's head, the inflatable could include a projection material for at least a portion of the front face an then use a camera, projector, etc. to project an image so that the inflatable looks like it is talking and/or expressing certain emotions. As can be appreciated, the particular projected image on a portion of the inflatable device can be used to enhance the features of a particle shaped inflatable device as well as increase public interest in and attention to the message being conveyed by the inflatable device. As can be appreciated, many other shapes for the inflatable device can be used.

In accordance with a further and/or alternative aspect of the invention, the inflatable device includes a service access to enable authorized individuals to access the interior of the inflatable device when in a partially or fully inflated state. The interior of the inflatable device typically includes mechanical and/or electrical devices. Once the inflatable device is partially or fully inflated, these mechanical and/or electrical devices must be inserted in the interior of the inflatable device when the device is being set up or removed from the interior of the inflatable device when the device is being disassembled. In addition, the mechanical and/or electrical devices may need to be adjusted and/or maintained while the inflatable device is in an inflated state. The service access is designed to enable authorized persons to insert, remove and/or adjust the equipment inside the inflatable device. In one embodiment, the inflatable device includes one or more service accesses. In one aspect of this embodiment, the service access can be opened and closed by a variety of arrangements such as, but not limited to, a zipper, Velcro, snaps, etc. In another and/or alternative embodiment, one or more service accesses are position inconspicuously on the inflatable device so as to not detract from the look of the inflatable device.

In accordance with a further and/or alternative aspect of the invention, the inflatable device includes one or more serving alcoves on a portion of the inflatable device so that the device can be used as a booth for providing information, for providing and/or selling merchandise, and/or for providing and/or selling food and/or drink. In one embodiment of the invention, the service alcove is located in a region spaced from the region used to project and/or display a non-fixed multimedia image. In another and/or alternative embodiment of the invention, the serving surface of the serving alcove is similar to one or more features disclosed in U.S. Pat. No. 5,555,679, which is incorporated herein by reference.

In accordance with still a further and/or alternative aspect of the invention, the inflatable device can be inflated and maintained in an inflated state by "cold air" inflation and/or by "sealed air" inflation. Cold air inflation is defined as inflation by use of a blower. As can be appreciated, the air blown into the inflatable can be preheated or heated by the blower; however, such heating or preheating still is defined as "cold air inflation." The blower is connected to one or more portions of the inflatable device and air is constantly or periodically blown into the inflatable device to maintain the inflated state of the inflatable device. Sealed air inflation is defined as the insertion of a gas (e.g. air, helium, etc.) into one or more components of inflatable device until the inflatable device or a portion of the inflatable device is inflated to a desired state, and then the gas insertion point is sealed off to inhibit or prevent the inserted gas from escaping. When the one or more components of the inflatable device are inflated by "cold air" inflation, the seams of the inflatable are typically sewn or otherwise connected to allow and/or enable leakage of the gas blown into the inflatable device to escape from the inflatable device. As a result, gas must be constantly or periodically blown into the inflatable device to maintain the desired inflated state of the inflatable device. When the one or more components of the inflatable device are inflated by "sealed air" inflation, the seams of the inflatable are welded together to minimize or prevent leakage of the gas that has been inserted into the inflatable device. Alternatively, an inflatable bladder can be inserted in certain sections of the inflatable device to be used to partially or fully inflate the inflatable device. The one or more inflatable bladders can be made of a variety of materials that are flexible and substantially air tight (e.g., urethane, rubber, etc.). Once the inflatable device or one or more components of the inflatable device have been inflated, no further inflation is required before the inflatable device has to be disassembled. As can be appreciated, the inflatable device may have to be partially inflated if there is slight leakage from the welded seam, due to temperature changes, etc.

The primary object of the present invention is to provide an inflatable device that includes one or more multimedia components.

Another and/or alternative object of the present invention is to provide an inflatable device that includes at least one panel that us used to display images generated by a multimedia device located on and/or within the inflatable device.

Still another and/or alternative object of the present invention is to provide a portable advertising and/or multimedia display that can be used in many different environments.

Yet another and/or alternative object of the present invention is to provide a portable advertising and/or multimedia display that can create a darkened environment to enable multimedia displays to be used at all times of the day.

Another and/or alternative object of the present invention is to provide a portable advertising and/or multimedia display that can be at least partially inflated and deflated for easy setup and transport to various locations.

Still yet another and/or alternative object of the present invention is to provide a portable advertising and/or multimedia display that can have one or more surfaces illuminated.

A further and/or alternative object of the present invention is to provide a portable advertising and/or multimedia display that includes an illuminating system which can be conveniently mounted on or within an inflatable device.

Still a further and/or alternative object of the present invention is to provide a portable advertising and/or multimedia display that is modular in design and can be easily assembled together to form a desired inflatable device.

Yet a further and/or alternative object of the present invention is to provide a portable advertising and/or multimedia display that is made of substantially air impermeable materials which are flexible and resistant to wear.

Still yet a further and/or alternative object of the present invention is to provide a portable advertising and/or multimedia display that includes a blower to inflate one or more components of the device.

Another and/or alternative object of the present invention is to provide a portable advertising and/or multimedia display that can be at least partially inflated by a "sealed air" system.

Still another and/or alternative object of the present invention is to provide a portable advertising and/or multimedia display that can be made into a variety of shapes and sizes.

These and other objects and advantages will become apparent to those skilled in the art upon reading and following the description taken together with the accompanied drawings.

DESCRIPTION OF THE PREFERRED EMBODIMENTS

Figure 1:
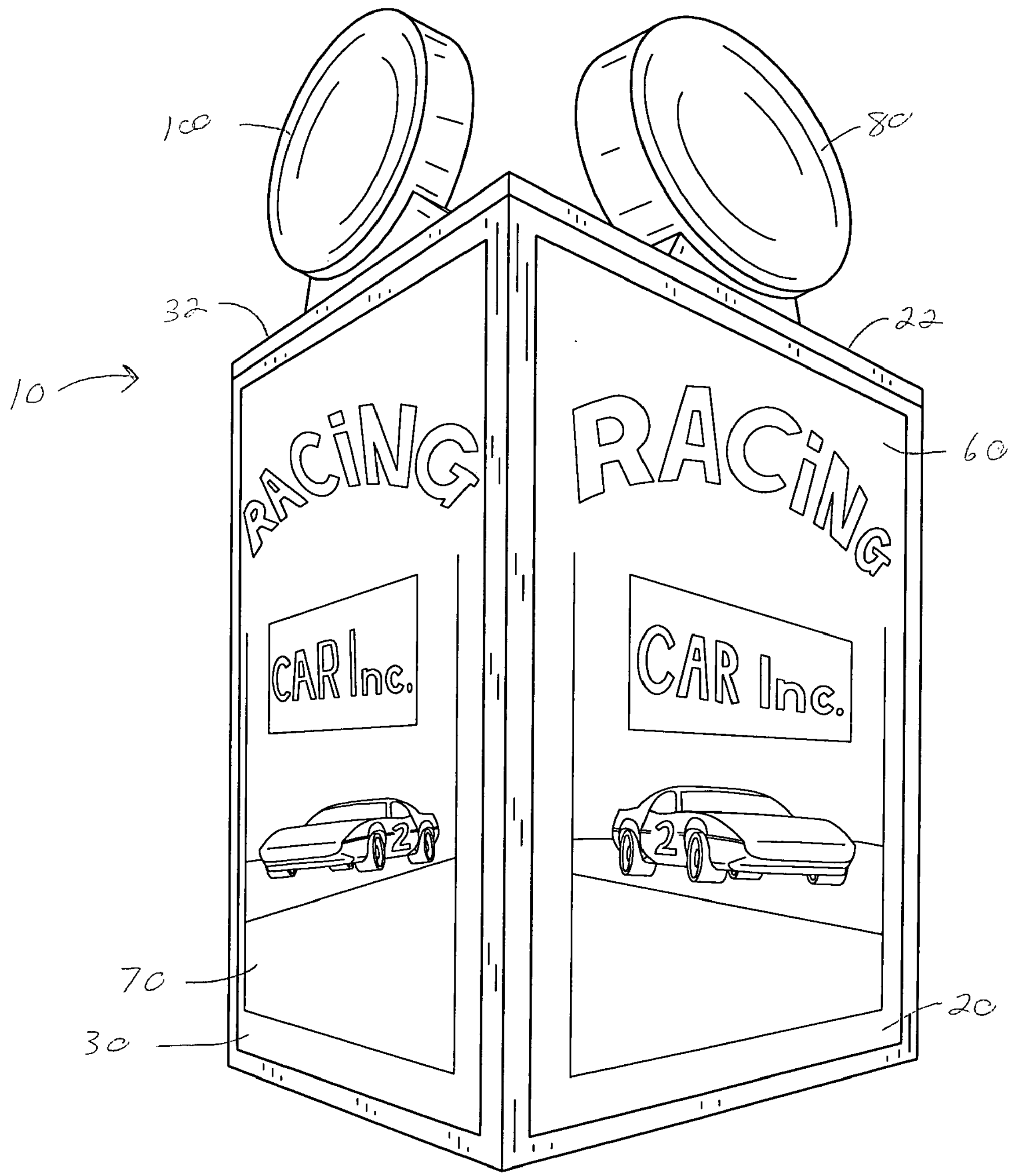
FIG. 1 is a plan view of the multimedia inflatable device of the present invention illustrating two printed advertising panels connected to two sides of the inflatable device.
Figure 3:
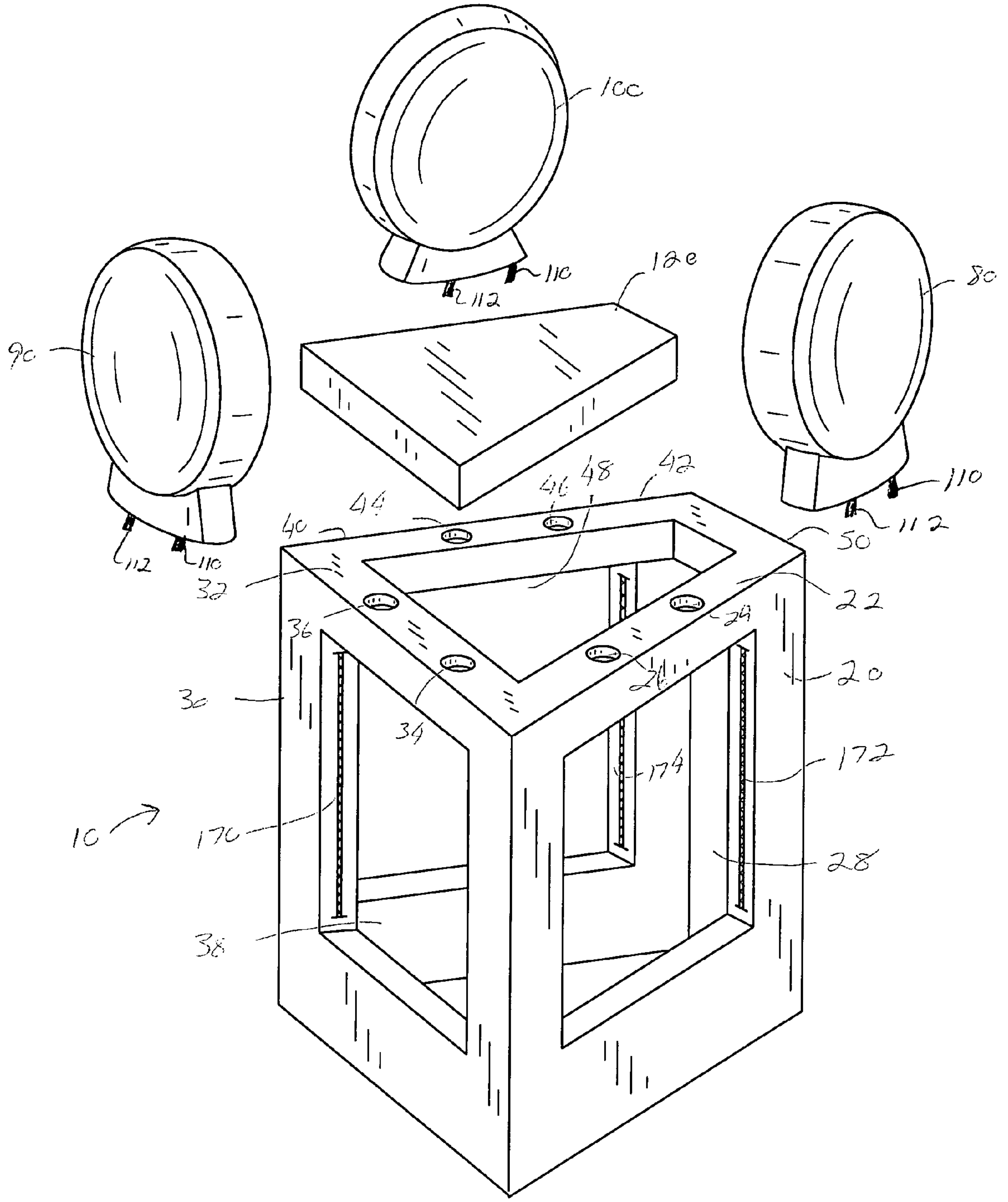
FIG. 3 is a partially exploded view of the multimedia inflatable device of FIG. 2.

Referring now to the preferred embodiment of the drawings, wherein the showings are for the purpose of illustrating preferred embodiments of the invention only and not for the purpose of limiting the invention, FIG. 1 illustrates an inflatable kiosk 10 in accordance with the present invention. The inflatable kiosk has three primary sides 20, 30,40 and one secondary side 50 such that the cross-section of the kiosk has the shape of a rhombus as best illustrated in FIG. 3. As can be appreciated, the inflatable kiosk can have more or less sides depending the desired shape of the kiosk. For example, the kiosk could have a cross-section shaped as a circle, an oval, a triangle, a square, a pie wedge, a parallelogram, a pentagon, a hexagon, etc. Sides 20,30, and 40 each include a square shaped opening 28, 38 and 48, respectively, as illustrated in FIG. 3. As can be appreciated, the openings can have different shapes. As can further be appreciated, one or more openings can have a different size and/or shape of one or more other openings. The size of the kiosk can be varied depending on the particular application. Typically, the kiosk has a height of about 10–40 feet, about 6–35 feet wide or deep when being used in larger venues; however, other sizes can be used. In one non–limiting example, the rhombus shaped kiosk illustrated in FIGURE can have a height of about 15–25 feet, a maximum width of about 6–20 feet and a maximum depth of about 5–18 feet.

As shown in FIG. 1, openings 28 and 38 of sides 20 and 30 are covered with a printed advertisement 60, 70. The printed advertisement covers substantially the full side of the inflatable kiosk; however, it will be appreciated, that the printed advertisement can be made to only cover a portion of the side. The printed advertisement typically is used to convey information about the sponsor of an event, sale, etc. and/or to provide information on or about a particular product and/or service at the event. As can be appreciated, the printed advertisement can include many other types of information.

Positioned on the top edges 22,32,42 of sides 20,30 and 40, respectively, are top advertising panels 80, 90, 100 having a circular shape. As can be appreciated, the top advertising panels can have other shapes. The top advertising panels can be formed to inflate or be a fixed shaped structure. The top advertising panels are typically used in a similar fashion as sides 20, 30, and 40 to convey information about the sponsor of an event, sale, etc. and/or to provide information on or about a particular product and/or service at the event. As can be appreciated, the top advertising panels can be used to display other types of information. The top advertising panels can be designed to be fixed to the main body of the kiosk or be detachable from the kiosk. When the top advertising panels are detachably connected, the versatility of the inflatable kiosk is increased in that different shaped and designed panels can be used for differing functions. Additionally, the sides of the kiosk can be fixed together or be modular components that can be attached and detached from one another. Typically, two or more sides of the inflatable kiosk are a fixed together and the top advertising panels are detachably connected to the top edges of the sides. As shown in FIG. 3, sides 20, 30, 40, and 50 are affixed together. Top advertising panels 80,90 and 100 are shown to be detachably connected to the top edges of the sides of the kiosk. Each of the top edges includes two slots 24, 26 for side 20; 34, 36 for side 30; and 44, 46 for side 40. The slots are used to receive two connection poles 110, 112, that are located on the base of each of the top advertising panels. The connection poles are used to position the top advertising panels on the top edges of the sides. The poles can also be used to connect the top advertising panels to the top of the inflatable kiosk. The poles can also be used to function as a fluid passage to allow a fluid such as air to pas from the sides into the top advertising panels to thereby inflate the top panels when the top advertising panels are inflatable.

As illustrated in FIG. 3, the top of the inflatable kiosk includes a top section 120. The top section is typically connected to the sides of the kiosk and is an inflatable device; however, it can be appreciated that the top can be detachably connected to the sides of the kiosk and/or be a non-inflatable device.

The basic structure of the inflatable kiosk as to its component construction, the manner of connection, and materials used to form the structures is similar to the that disclosed in U.S. Pat. Nos. 5,555,679; and 5,937,586; and U.S. patent application Ser. Nos. 10/217,677 filed Aug. 12, 2002 entitled "Inflatable Component Connector" and No.60/441,013 filed Jan. 17, 2003 entitled "Inflatable Projection Screen" are incorporated herein by reference, thus will not be further described in detail.

Figure 2:
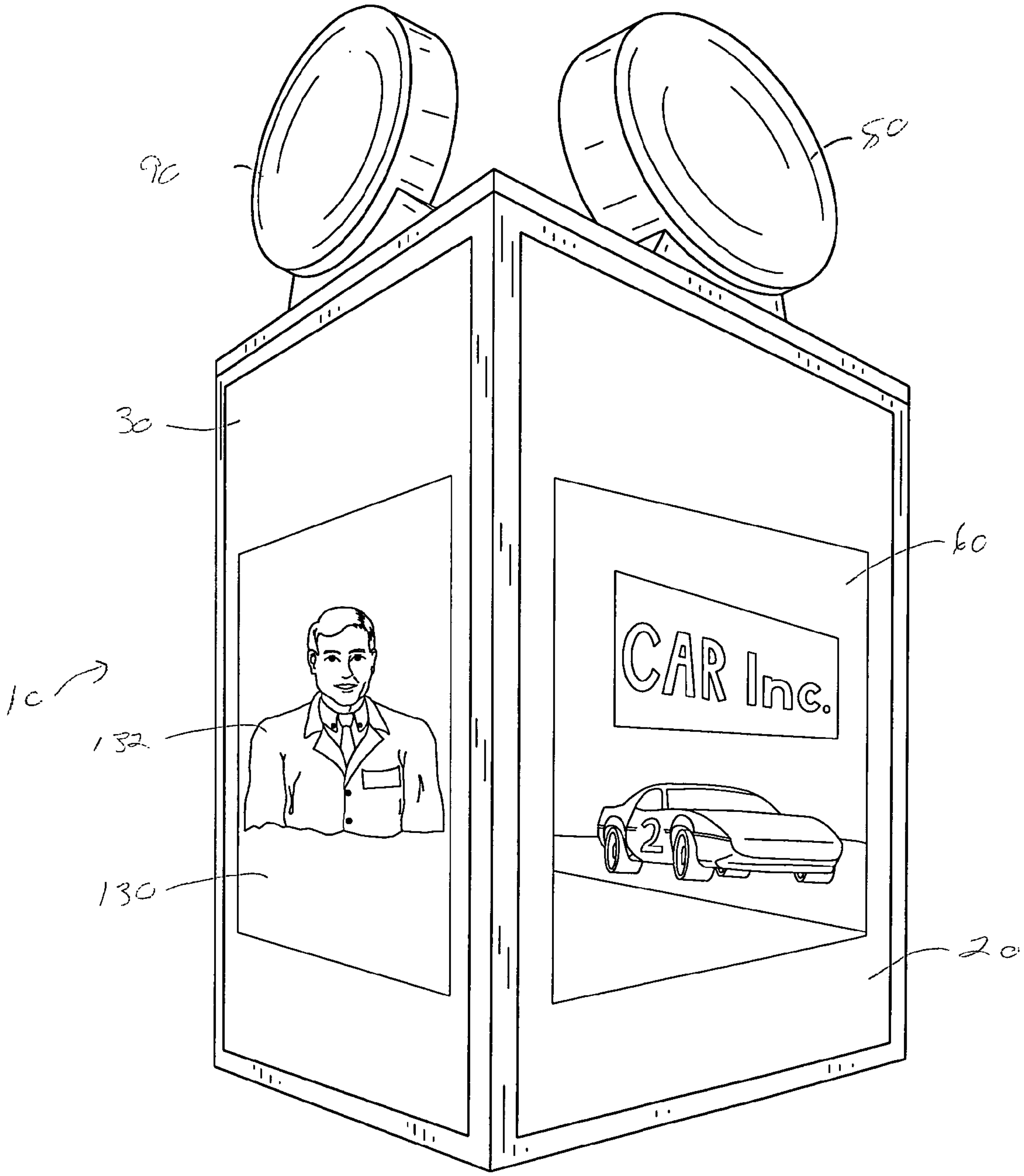
FIG. 2 is a plan view of the multimedia inflatable device of the present invention illustrating one printed advertising panel connected to one side of the inflatable device and a backlit screen receiving a projected image on another side of the inflatable device.
Figure 5:
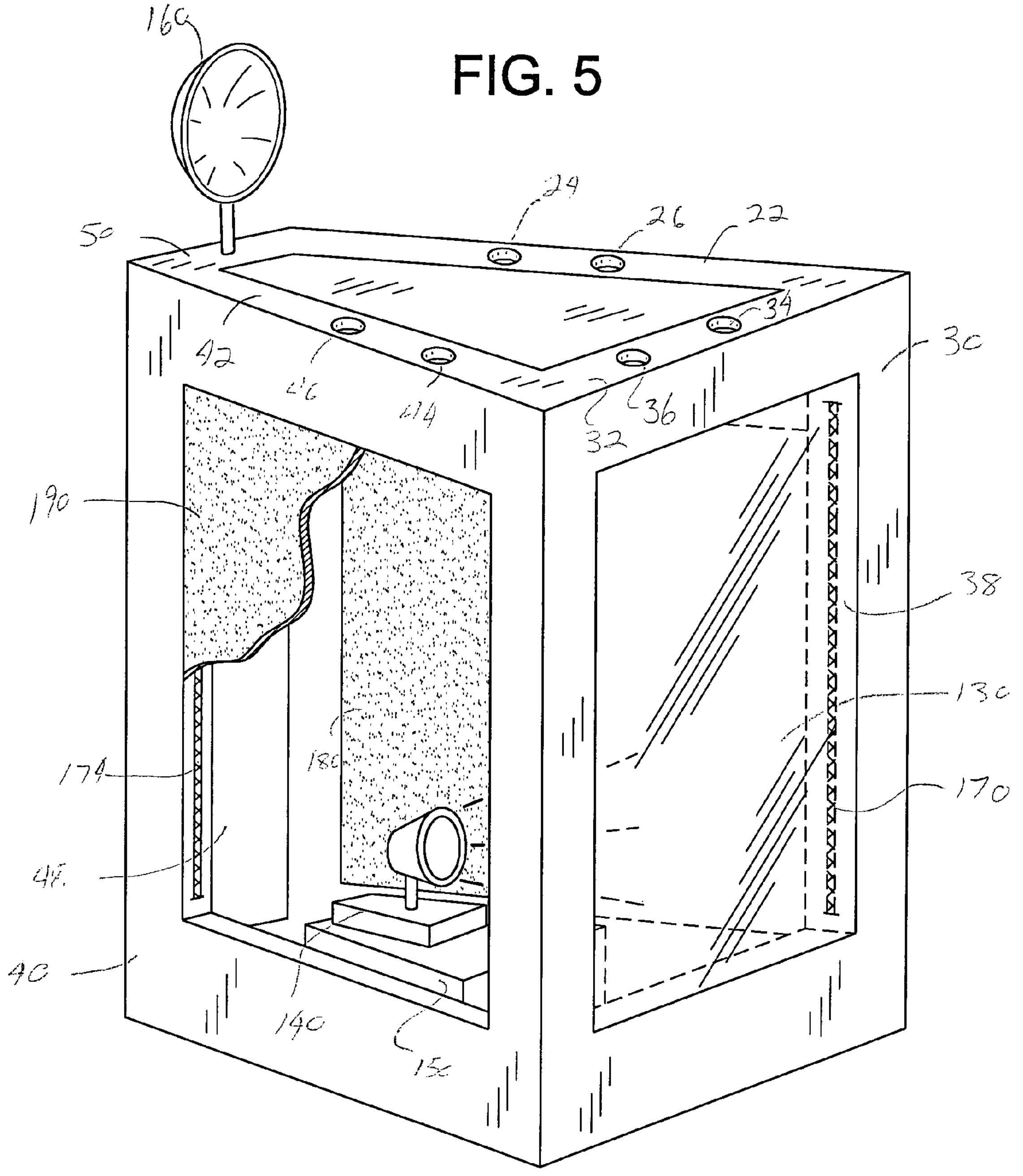
FIG. 5 is a plan view of the multimedia inflatable device of the present invention illustrating a multimedia system positioned in the interior of the inflatable device.

Referring now to FIG. 2, side 20 of the kiosk includes printed advertisement 60 and side 30 includes a backlit material 130 that is used to display an image 132 that has been projected by a projector 140 on the interior side of the backlit material as shown in FIG. 5. The projected image can be in the form or a live feed broadcast such as at a sporting event wherein live coverage is displayed on the screen. As can be appreciated, the displayed image can be prerecorded image generated from a DVD, tape, etc. Additionally, the displayed image can be generated by satellite reception, a cable connection of from a TV antenna. As illustrated in FIG. 5, the projector 140 is positioned in the interior of the kiosk. Typically the projector is elevated off the ground by placing the projector on a table 150 or other type of structure; however, this is not required. As can be appreciated, one or more structures can be built in or formed in the interior and/or exterior of the kiosk to fully or partially support one or more components of the multimedia system. The projector can be connected to a DVD and/or VCR, and/or be connected to a cable and/or satellite feed. Various multimedia components can be positioned in the interior of the inflatable device (e.g., speakers, amplifiers, receivers, communication equipment, satellite dish, power system, etc.) to accomplish the desired effects of the inflatable device. Although not shown, speakers can be placed throughout the kiosk (e.g., inside, outside, within the components, etc.) to generate the desired sound. Typically the receiver, amplifier, tape player, DVD player, CD player, etc., when used, are positioned in on the inside of the kiosk. The audio equipment and speakers can be used to provide sound alone or with images being displayed on the display screen. As such, the inflatable device can be a portable, self-contained advertising and/or media center. The projector is positioned so as to project an image on the interior surface of the backlit material so as to cause a picture to form on the front surface of the material for viewing by the public. When live feed is used to activate the projector and/or to transmit and image to the projector, the multimedia system of the kiosk typically includes one or more satellite dishes and/or antennas. These satellite dishes and/or antennas can be positioned inside the kiosk or one or more of the satellite dishes and/or antennas can be positioned on the exterior of the kiosk. As illustrated in FIG. 5, a satellite dish 160 is mounted on the top edge of side wall 50. As can be appreciated, an antenna alternatively or additionally can be mounted on the top edge of side wall 50. As can further be appreciated, the satellite dish and/or antenna can be mounted in other locations on the kiosk. The satellite dish and/or antenna can be hidden in one or more of the top advertising panels.

Referring again to FIGS. 3 and 5, backlit material 130 is secured to opening 38 of side wall 30 by a zipper 170. The zipper allows for easy removal and replacement of the backlit screen when the screen is damaged or becomes dirty. As can be appreciated, other mechanisms (e.g., Velcro, snaps, etc.) can be used to removably detach the backlit material from opening 38. Openings 28 and 48 on side walls 20 and 40 can also include a zipper 172, 174 to insert and removably detach a backlit material and/or advertising panel that is connected to such walls.

Figure 4:
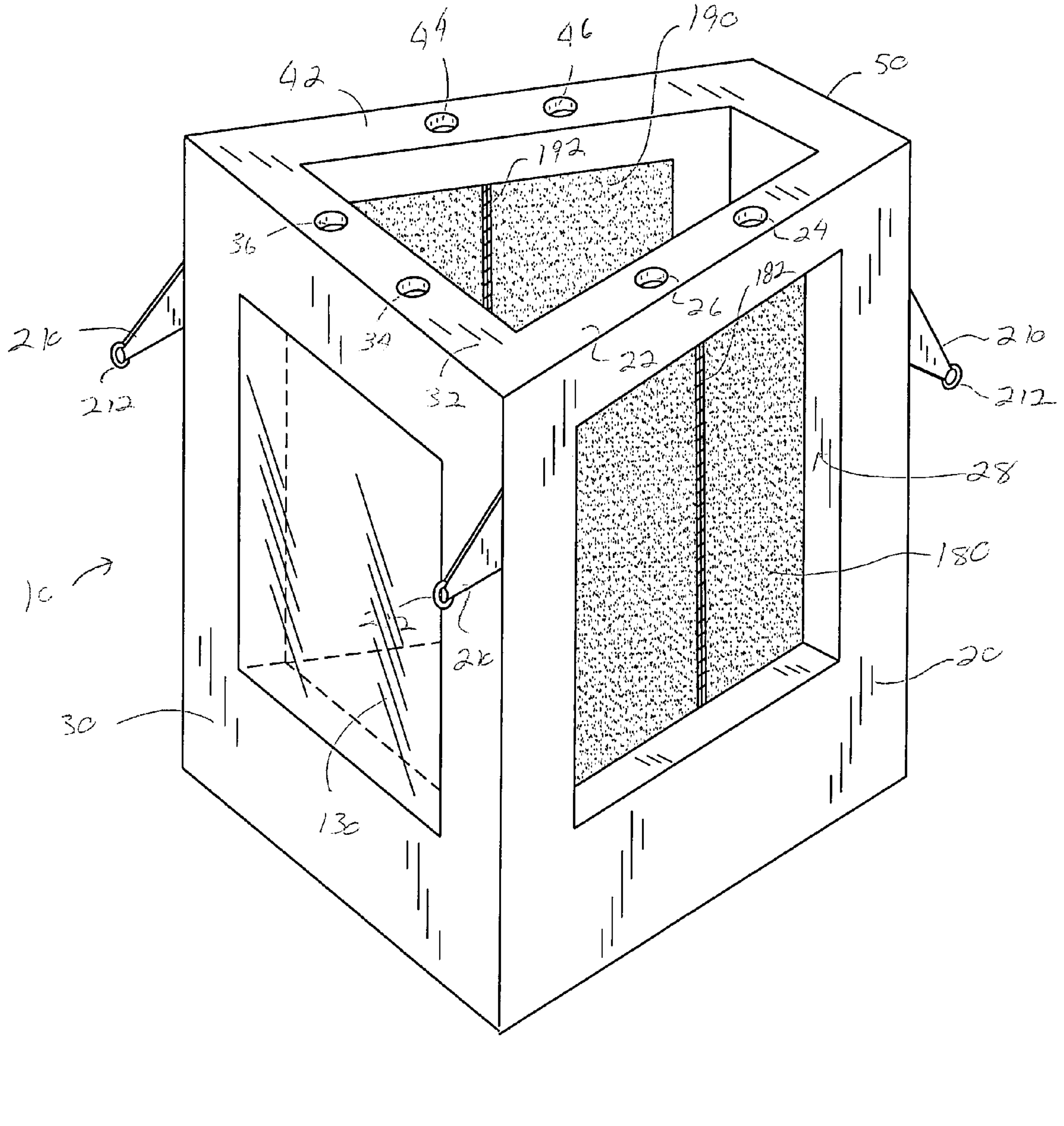
FIG. 4 is a plan view of the multimedia inflatable device of the present invention illustrating blackout curtains in two openings and a backlit screen in one opening of the inflatable device.
Figure 6:
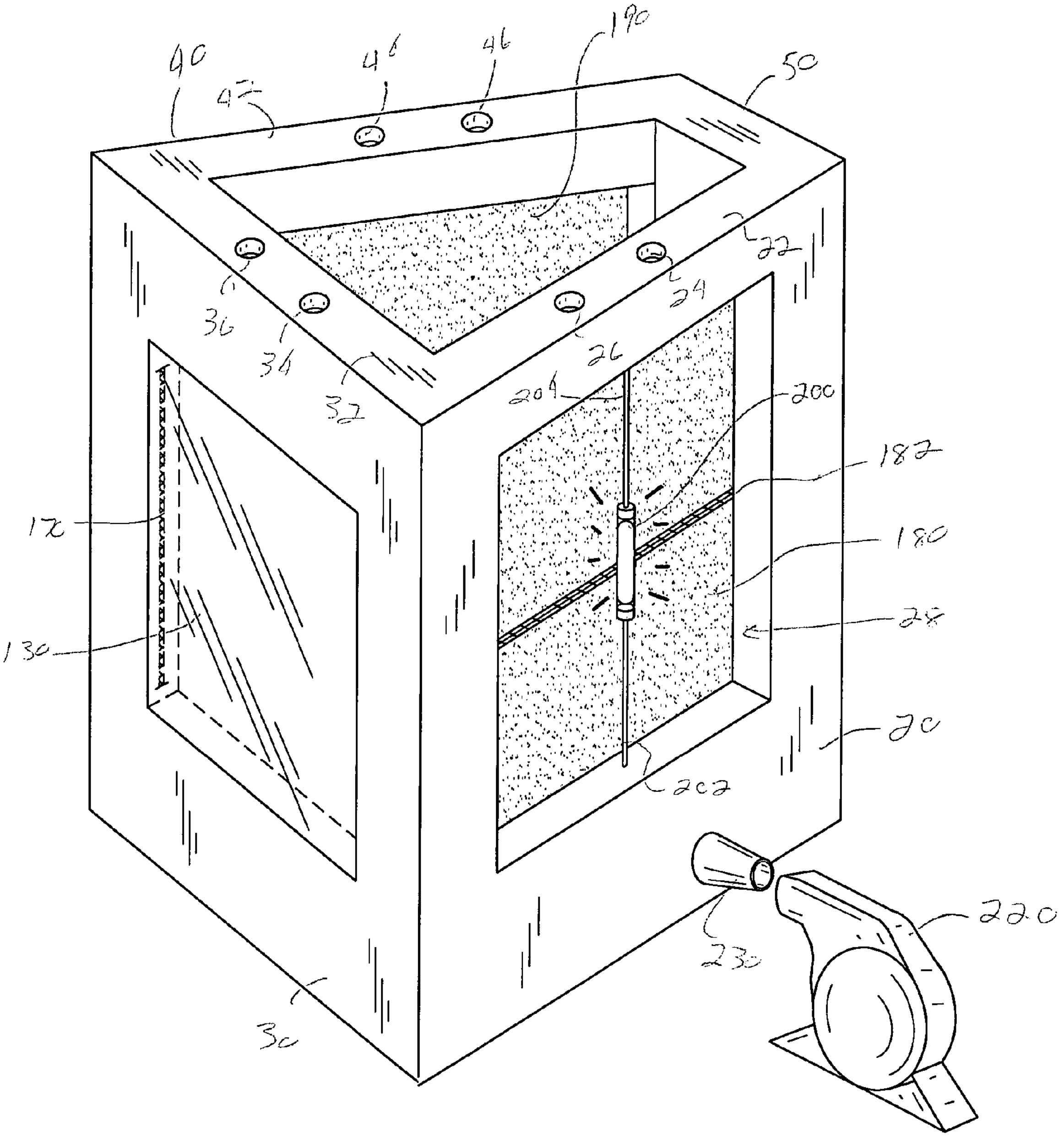
FIG. 6 is a plan view of the multimedia inflatable device of the present invention illustrating an illuminating device on one side of the inflatable device.
Figure 7A:
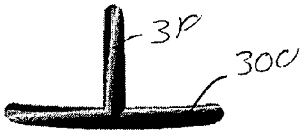
FIGS. 7A–D and 8A–D are multiple views of an arrangement of the multimedia inflatable device of the present invention; and, FIGS. 9A–C are cross-sectional views of an inflatable component of the inflatable device of FIGS. 7 and 8.
Figure 7B:
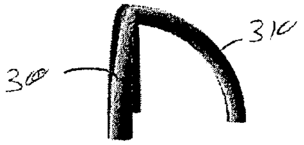
Figure 7C:
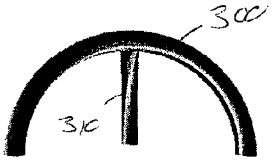
Figure 7D:
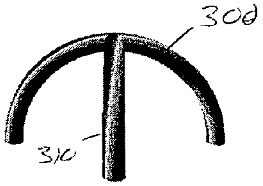
Figure 8A:
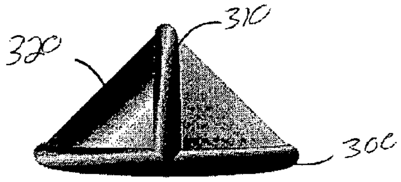
Figure 8B:
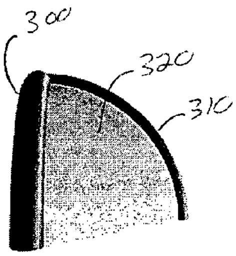
Figure 8C:
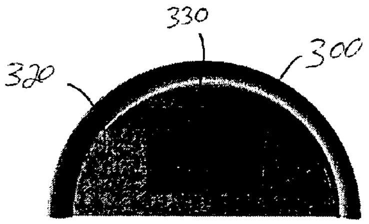
Figure 8D:
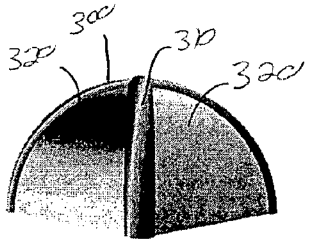

Referring now to FIGS. 4–6, opening 28 of side wall 20 includes a blackout material 180 and opening 48 of side wall 40 includes a blackout material 190. The blackout material is designed to reduce or prevent light from passing from the interior of the kiosk through openings 28 and 38 and to also reduce or prevent light from entering into the interior of the kiosk. Typically the blackout material is a dark material such as, but not limited to, a black material. The blackout material is typically stitched to the sides of the kiosk; however, the blackout material can be connected to the kiosk by zippers 172, 174 or in other ways such as, but not limited to, snaps, clips, etc. When a projector is used to project an image on the interior side of a backlit screen, exterior light that passes through other sides of the kiosk can interfere with the clarity and/or brightness of the projected image. The blackout material is designed to reduce or prevent such light from interfering with the quality of the projected image. As illustrated in FIG. 4, openings 28 and 48 of sides 20 and 40 include a blackout material 180, 192 and opening 38 of side 30 includes a backlit material 130 to receive a projected image from the projector located in the interior of the kiosk. The blackout material covering openings 28 and 48 reduces or prevents outside light from entering the interior of the kiosk and interfering with the picture being projected in the inside surface of the backlit material. The material that forms the walls of the kiosk is also typically selected to block at least a portion of the light that contacts the outer surface of the material. As a result, a darkened area is formed within the kiosk at all times of the day. This darkened area enables the projector to project relatively large and vivid images on the backlit material with a projector having a relatively low lumen output. Typically the projector used in the kiosk need not generate more than about 100,000 lumen, and typically less than about 60,000 lumen, and more typically less than 10,000 lumen to form the desired image quality on the backlit material.

As illustrated in FIGS. 4 and 6, a zipper 182, 192 is used to connect together two portions of the backout material. The zipper can be positioned vertically as shown in FIG. 4, horizontally as shown in FIG. 6 or in some other position. The zipper is primarily used to provide an access to the blackout material so as to permit light to enter into or exit from the kiosk interior if so desired. The also is used to provide access to mechanisms such as, but not limited to, a light 200 as illustrated in FIG. 6. The light is typically the same as or similar to the light disclosed in U.S. Pat. No. 6,527,418 entitled "Light Cooler", which is incorporated herein by reference. The light is illustrated as being hung in opening 28 and held in position by a wire, a cord, and/or harness 202, 204. The wire, cord, and/or harness can be used to adjust the position of the light in the opening. The light is used to illuminate a printed banner that is attached to the outside of opening 28. The blackout material in opening 28 is positioned behind the light and inhibits or prevents light from entering into the interior of the kiosk. As can be appreciated, more than one light can be positioned in opening 28. When opening 38 and/or 48 is covered by a printed banner, a light is typically used to illuminate the banner.

Referring now to FIG. 4, one or more side edges of the kiosk typically include an anchoring strap 210. The anchoring strap is used to secure the kiosk in position on a ground surface. The anchoring strap 210 is shown to have a ring 212. The ring is used to be secured to a rope, cord, chain or the like that is in turn connected to a stake or other device secured to the ground. Each edge of the inflatable device typically includes an anchoring strap; however, this is not required.

Figure 9A:
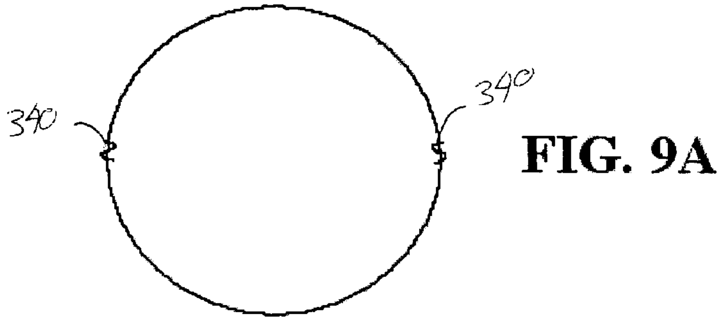
Figure 9B:
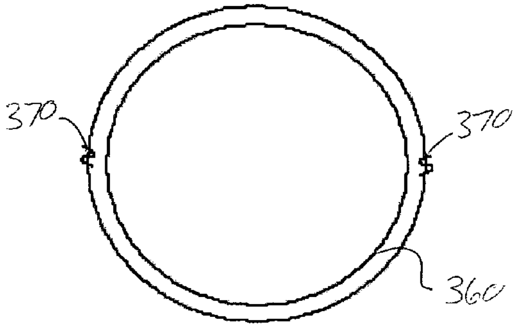
Figure 9C:
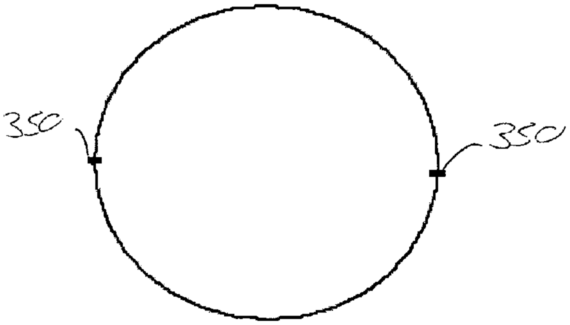

As illustrated in FIG. 6, the kiosk is inflated by a blower 220. The outlet of the blower is connected to a blower opening 230 located at the base of the kiosk. The blower supplies air to the kiosk to maintain the kiosk in an inflated state. As shown in FIG. 6, the blower is located externally of the kiosk. As can be appreciated, the blower can be located in the interior of the kiosk. Also, it can appreciated that the seams of the kiosk can be welded together and/or an inflatable bladder can be positioned on or within the walls of the kiosk to maintain the kiosk in an inflated state without the use of a fan blower as illustrated in FIGS. 9B and 9C.

Referring now to FIGS. 7 and 8, another shaped kiosk is illustrated. The inflatable components of the inflatable device consists of one semi-circular tube 300 and another semi-circular tube 310 that is connected to about the mid-potion of tube 300. FIG. 7A illustrates the top view of this structure, FIG. 7B illustrates the side of this structure, FIG. 7C illustrates the front of this structure and FIG. 7D illustrates the back of this structure. Similar views of this structure as shown in FIGS. 8A–D respectively wherein a fabric 320 is connected to tubes 300 and 310. The shape of the inflatable structure is similar to a quarter slice of a sphere. As can be appreciated, many other shapes can be formed by this tube structure. The material forming the inflatable tubes can be sewn together as illustrated by stitching 340 of FIG. 9A, or be welded together as illustrated by welded seam 350 of FIG. 9C, or include an inflatable bladder 360 positioned within a material stitched together by stitching 370 as shown in FIG. 9B. As shown in FIG. 8C, positioned on fabric 320 on the from face of the inflatable a portion of the kiosk is a backlit material 330 that is use to display images and/or lights from multimedia equipment positioned in the interior of the kiosk.

The invention has been described with reference to the preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

I claim:

1. An inflatable device comprising a portable inflatable structure that includes at least one inflatable component and a first multimedia device, said portable inflatable structure forming a first interior region when said portable inflatable structure is at least partially inflated, said first interior region at least partially containing said first multimedia device, said first interior region including a light blocking material and a first display screen, said first display screen visible from an exterior of said portable inflatable structure, said first display screen formed of a material that is designed to display at least one image projected onto the first display screen by said first multimedia device, said light blocking materials creating a darkened environment to inhibit exterior light from entering said first interior region and to inhibit light from said first multimedia device from being externally displayed on portable inflatable structure in region other than said first display screen.

2. The inflatable device as defined in claim 1, wherein said first display screen includes a backlit material designed to display at least one image from said first multimedia device which is spaced from said first display screen.

3. The inflatable device as defined in claim 1, wherein said portable inflatable structure includes a second interior region, said first and second interior regions at least partially divided by a partition, said partition at least partially formed of alight blocking material, said second interior region including a display surface and an illumination source that is separate from said multimedia device, said illumination source positioned between said partition and said display surface, said display surface visible from an exterior of said portable inflatable structure, said display surface including a surface selected from the group consisting of a fixed image or a second display screen.

4. The inflatable device as defined in claim 2, wherein said portable inflatable structure includes a second interior region, said first and second interior regions at least partially divided by a partition, said partition at least partially formed of a light blocking material, said second interior region including a display surface and an illumination source that is separate from said multimedia device, said illumination source positioned between said partition and said display surface, said display surface visible from an exterior of said portable inflatable structure,said display surface including a surface selected from the group consisting of a fixed image or a second display screen.

5. The inflatable device as defined in claim 3, wherein said display surface, said first display screen or combinations thereof are detachably connected to said portable inflatable structure.

6. The inflatable device as defined in claim 4, wherein said display surface, said first display screen or combinations thereof are detachably connected to said portable inflatable structure.

7. The inflatable device as defined in claim 1, wherein said multimedia device includes video equipment, said video equipment designed to display non-fixed images on said first display screen.

8. The inflatable device as defined in claim 6, wherein said multimedia device includes video equipment, said video equipment designed to display non-fixed images on said first display screen.

9. The inflatable device as defined in claim 1, wherein said first interior region includes a support surface, said ledge designed to at least partially elevate and support at least a portion of said first multimedia device above a base of said interior region and in a position so that images from said first multimedia device are properly displayed on said first display screen.

10. The inflatable device as defined in claim 8, wherein said first interior region includes a support surface, said ledge designed to at least partially elevate and support at least a portion of said first multimedia device above a base of said interior region and in a position so that images from said first multimedia device are properly displayed on said first display screen.

11. The inflatable device as defined in claim 1, wherein said portable inflatable structure includes at least one anchoring strap.

12. The inflatable device as defined in claim 10, wherein said portable inflatable structure includes at least one anchoring strap.

13. The inflatable device as defined in claim 1, wherein said portable inflatable structure includes a first generally flat side, said first generally flat side including said first display screen.

14. The inflatable device as defined in claim 12, wherein said portable inflatable structure includes a first generally flat side, said first generally flat side including said first display screen.

15. The inflatable device as defined in claim 13, wherein said portable inflatable structure includes a plurality of generally flat sides.

16. The inflatable device as defined in claim 14, wherein said portable inflatable structure includes a plurality of generally fiat sides.

17. The inflatable device as defined in claim 16, wherein said portable inflatable structure has a generally polygonal cross-sectional shape.

* * * * *